United States Patent
Katayama et al.

(10) Patent No.: US 7,150,294 B2
(45) Date of Patent: Dec. 19, 2006

(54) FUEL CELL HOSE

(75) Inventors: Kazutaka Katayama, Kasugai (JP); Koyo Murakami, Nagoya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 134 days.

(21) Appl. No.: 11/044,303

(22) Filed: Jan. 28, 2005

(65) Prior Publication Data

US 2005/0189030 A1   Sep. 1, 2005

(30) Foreign Application Priority Data

Jan. 30, 2004  (JP) ............................. 2004-023395

(51) Int. Cl.
*F16L 11/00* (2006.01)

(52) U.S. Cl. .................... 138/137; 138/141; 428/36.91

(58) Field of Classification Search ................ 138/137, 138/141; 428/36.91
See application file for complete search history.

(56) References Cited

U.S. PATENT DOCUMENTS

| | | | |
|---|---|---|---|
| 4,320,084 A | 3/1982 | Elgner | 264/540 |
| 5,616,418 A | 4/1997 | Vasselin et al. | 428/474.7 |
| 5,776,589 A | 7/1998 | Mace et al. | 428/212 |
| 6,576,312 B1 | 6/2003 | Ito et al. | 428/36.91 |
| 6,619,329 B1 * | 9/2003 | Ikemoto et al. | 138/126 |
| 7,011,114 B1 * | 3/2006 | Suzuki et al. | 138/137 |
| 2002/0090477 A1 * | 7/2002 | Ito et al. | 428/36.91 |
| 2005/0217745 A1 * | 10/2005 | Watanabe et al. | 138/137 |
| 2005/0221040 A1 * | 10/2005 | Koike et al. | 428/36.91 |

FOREIGN PATENT DOCUMENTS

| | | |
|---|---|---|
| EP | 0649739 | 4/1995 |
| EP | 0636225 | 3/2003 |
| JP | 2001-225425 | 8/2001 |
| JP | 2002-122273 | 4/2002 |
| JP | 2002-213659 | 7/2002 |
| JP | 2004-285905 | 10/2004 |
| WO | WO 98/36902 | 8/1998 |

OTHER PUBLICATIONS

European Search Report dated Sep. 1, 2005, EP 05 25 0447.

* cited by examiner

*Primary Examiner*—James Hook
(74) *Attorney, Agent, or Firm*—Armstrong, Kratz, Quintos, Hanson & Brooks, LLP

(57) ABSTRACT

A fuel cell hose which is superior in flexibility (low-temperature flexing property) and in barrier properties against hydrogen gas or water, and causes no defects such as buckling or cracking when press-fitting of a connector. The hose comprises an inner layer 1 in contact with fluid and an outer layer 3 formed on an outer peripheral surface of the inner layer, the inner layer being formed by a material (A) comprising a polyolefin resin and a styrene-isobutylene block copolymer and the outer layer being formed by a material (B) comprising a polyamide resin and a styrene-isobutylene block copolymer.

16 Claims, 1 Drawing Sheet

FUEL CELL HOSE

BACKGROUND OF THE INVENTION

1. Field of the Invention

The present invention relates to a fuel cell hose, and, in particular, to a fuel cell hose for transporting pure water and to a hydrogen hose for transporting hydrogen or hydrogen-containing water.

2. Description of the Art

It is generally understood that fuel cell systems, especially fuel cell systems using polymer electrolytes, will be widely accepted as future power generation systems. However, the portion of a fuel cell system used for generating electricity is vulnerable to contact with foreign matter such as sulfur, metal ions or the like. Therefore, performance of the portion used for generating electricity is drastically deteriorated if such foreign matter enters the portion. For this reason, the hose used in a fuel cell system should have a low extraction property. In other words, it should be difficult for the hose to be extracted by water flowing therethrough and thus the hose should have a high standard of cleanliness. Further, when fuel cell systems especially are used for vehicles, one of the important issues remaining is how to cool the great amount of heat generated thereby. Thus, it is thought that the role taken by the cooling system is significantly important. Further, when the electrical conductivity of a coolant such as LLC (Long Life Coolant) increases in a fuel cell system, electrical short-circuiting tends to occur. Therefore, it is required that the insulation property of internal fluid (water or LLC) be maintained. In other words, a hose used in a fuel cell system is required to suppress ion extraction so as to not increase the electrical conductivity of the fluid.

Heretofore, under such circumstances, a stainless (SUS) tube has been used for the above purposes in fuel cells because of its low ion dissolution. However, when using a SUS tube, it is difficult to mold the SUS tube or to compensate for any installation errors, which causes problems in terms of layout and assembly. In addition, SUS tubes have a problem of poor vibration durability.

For this reason, resin hoses have been recently used for fuel cell hoses instead of conventional SUS tubes. For example, a hose for carrying hydrogen comprising an inner layer made of a material selected from polypropylene (PP) resin, polyethylene (PE) resin, olefin thermoplastic elastomer (TPO), fluorine-containing resin and styrol resin, an intermediate layer made of an ethylene vinylalcohol copolymer (EVOH), and an outer layer made of polyamide resin has been proposed (see, for example, Japanese Unexamined Patent Publication No. 2002-213659).

However, in the case where the inner layer is made of polypropylene (PP) resin, polyethylene (PE) resin or styrol resin for a hydrogen hose as proposed in the above-mentioned publication, the inner layer is hard and inferior in flexibility. Therefore, when such a hose is cooled to a low temperature (about −40° C.) and the hose is bent to 180 degrees, abnormalities such as cracking on an inner or outer surface of the hose may occur, resulting in inferior low-temperature flexibility. Also, defects such as buckling or cracking may occur when a connector is press-fitted to the hose. When the inner layer is formed by the olefin thermoplastic elastomer (TPO), barrier properties against water or hydrogen gas are inferior. When the inner layer is formed by the fluorine-containing resin, a barrier property against hydrogen gas are inferior. Especially, when the inner layer is formed by soft fluorine-containing resin such as tetrafluoroethylene-perfluoroalkylvinyl ether copolymer (PFA), a barrier property against water are also inferior.

In view of the foregoing, it is an object of the present invention to provide a fuel cell hose which is superior in flexibility (low-temperature flexing property) and in barrier properties against hydrogen gas or water, and with which no defects such as buckling or cracking occur when press-fitting a connector to the hose.

SUMMARY OF THE INVENTION

In accordance with a first aspect of the present invention to achieve the aforesaid objects, there is provided a fuel cell hose comprising an inner layer in contact with fluid and an outer layer formed on an outer peripheral surface of the inner layer, the inner layer being formed by a material (A) comprising a polyolefin resin and a styrene-isobutylene block copolymer and the outer layer being formed by a material (B) comprising a polyamide resin and a styrene-isobutylene block copolymer.

The inventors of the present invention conducted intensive studies to provide a fuel cell hose which is superior in flexibility (low-temperature flexing property) and in barrier properties against hydrogen gas or water, and with which no defects such as buckling or cracking occur when press-fitting a connector to the hose. During the course of their studies, the inventors had the idea that good results might be obtained by using thermoplastic elastomer (TPE) for forming an inner layer and an outer layer of the hose. As results of accumulated studies on various thermoplastic elastomers, they discovered that effective barrier properties against hydrogen gas or water could not be expected with use of styrene thermoplastic elastomers such as a styrene-butadiene-styrene triblock copolymer (SBS), a styrene-isoprene-styrene triblock copolymer (SIPS) or a styrene-ethylenebutene-styrene triblock copolymer (SEBS). However, they discovered that a styrene-isobutylene block copolymer is excellent in barrier properties against hydrogen gas or water. From further studies based on the above-mentioned findings, they found that when blending a styrene-isobutylene block copolymer into polyolefin resin as a material for forming an inner layer and also using polyamide resin, having high reliability in terms of heat resistance and creep resistance, in combination with a styrene-isobutylene block copolymer for forming an outer layer, the above-mentioned object could be achieved. Thus, they attained the present invention.

According to the invention, a styrene-isobutylene block copolymer is blended into both of an inner layer and an outer layer of the inventive fuel cell hose. For this reason, the inventive fuel cell hose is superior in flexibility (low-temperature flexing property) and in barrier properties against hydrogen gas or water, and no defects such as buckling or cracking occur when press-fitting a connector to the hose.

Further, the inventive fuel cell hose may exclude a plasticizer from any layer constituting the fuel cell hose without difficulties. In the present invention, a plasticizer means a chemical compound having a plasticizing capacity such as n-butylbenzene sulfone amide and which also contains sulfur element in its molecular structure. Especially, when any layer constituting a hose does not contain such a plasticizer, fluid flowing through the hose will not be contaminated and thus low extraction property is excellent, resulting in a restriction on the deterioration in electrical generating capacity.

Further, when a compatibilizer is blended into the material for forming an outer layer, dispersibility of the polyamide resin and the styrene-isobutylene block copolymer can be improved and also elongation of the hose can be improved.

When the blending ratio by weight of the polyolefin resin and the styrene-isobutylene block copolymer for forming an inner layer is within a specific ratio, the thus obtained fuel cell hose has a good balance between barrier properties and low-temperature flexibility.

When the blending ratio by weight of the polyamide resin and the styrene-isobutylene block copolymer for forming an outer layer is within a specific ratio, the thus obtained fuel cell hose has a good balance between barrier properties and low-temperature flexibility.

BRIEF DESCRIPTION OF THE DRAWING

The sole FIGURE of the drawing is a sectional view illustrating one embodiment of a fuel cell hose according to the present invention.

DESCRIPTION OF THE PREFERRED EMBODIMENTS

Figure 1:
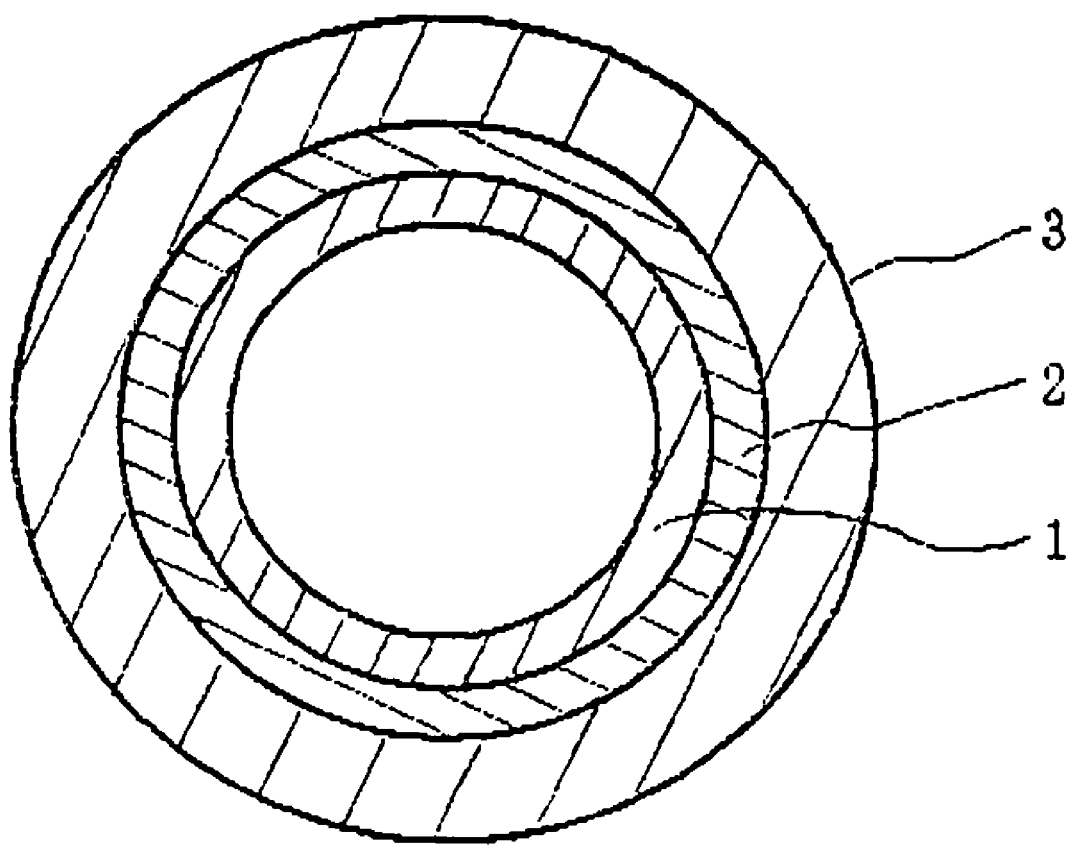

Embodiments of the present invention will hereinafter be described in detail.

An inventive fuel cell hose may have a structure, for example, as shown in the FIGURE, by forming an adhesive layer 2 on an outer peripheral surface of an inner layer 1 and forming an outer layer 3 on an outer peripheral surface of the adhesive layer 2.

The main feature of the present invention is that the inner layer 1 is formed by the specific materials as set forth above and also the outer layer 3 is formed by the specific materials as set forth above.

As the material for forming the inner layer 1, a polyolefin resin and a styrene-isobutylene block copolymer are used as essential components.

The polyolefin resin is not particularly limited, however, examples thereof include, for example, polypropylene (PP) resin, polyethylene (PE) resin, polybutene resin and polymethyl pentene resin, which may be used either alone or in combination. Among them, polypropylene (PP) resin is preferred in terms of heat-resistance and availability.

The styrene-isobutylene block copolymer used together with the polyolefin resin is not particularly limited as long as polystyrene (PS) is used as a hard segment and polyisobutylene (PIB) is used as a soft segment. Examples thereof include, for example, styrene-isobutylene diblock copolymer (SIB) and styrene-isobutylene-styrene triblock copolymer (SIBS) Among them, SIBS is preferred in terms of strength. Specific examples of SIBS include SIBSTAR available from Kaneka Corporation of Osaka, Japan.

The material for forming the inner layer 1 has the blending ratio by weight of the polyolefin resin to the styrene-isobutylene block copolymer preferably within the range of 20/80 to 80/20, especially preferably within the range of 60/40 to 40/60. When the blending ratio by weight of the polyolefin resin is less than 20 (or when the blending ratio by weight of the styrene-isobutylene block copolymer is over 80), a barrier property against water tends to deteriorate. When the blending ratio by weight of the polyolefin resin is over 80 (or when the blending ratio by weight of the styrene-isobutylene block copolymer is less than 20), the resultant fuel cell hose becomes too hard, and low-temperature flexibility and press-fitting of a connector tend to deteriorate.

The material for forming the inner layer 1 may further include one or more of a compatibilizer, carbon black, carbon electrically conductive agent, stable oxides such as clay, pigments and the like, as required, in addition to the polyolefin resin and the styrene-isobutylene block copolymer. As the compatibilizer, the same materials mentioned below as the materials for forming the outer layer 3 may be used.

As the material for forming the outer layer 3, a polyamide resin and a styrene-isobutylene block copolymer are used as essential components.

The polyamide resin is not particularly limited. Examples thereof include, for example, polyamide 6 (PA6), polyamide 66 (PA66), polyamide 99 (PA99), polyamide 610 (PA610), polyamide 612 (PA612), polyamide 11 (PA11), polyamide 910 (PA910), polyamide 912 (PA912), polyamide 12 (PA12), a copolymer of polyamide 6 and polyamide 66 (PA6/66) and a copolymer of polyamide 6 and polyamide 12 (PA6/12), which may be used either alone or in combination. Among them, PA12, PA11, PA910 and PA912 are preferred because of their excellent resistance to calcium chloride.

As the styrene-isobutylene block copolymer used together with the polyamide resin in forming the outer layer, the same materials mentioned as the materials for forming the inner layer 1 may be used.

The material for forming the outer layer 3 has the blending ratio by weight of the polyamide resin to the styrene-isobutylene block copolymer preferably within the range of 20/80 to 90/10, especially preferably within the range of 40/60 to 90/10. When the blending ratio by weight of the polyamide resin is less than 20 (or when the blending ratio by weight of the styrene-isobutylene block copolymer is over 80), rigidity tends to deteriorate so that buckling tends to occur. When the blending ratio by weight of the polyamide resin is over 90 (or when the blending ratio by weight of the styrene-isobutylene block copolymer is less than 10), the resultant fuel cell hose becomes inferior in flexibility so that defects such as buckling or cracking may occur when press-fitting a connector to the hose.

Further, a compatibilizer may be blended into the material for forming the outer layer 3. When the compatibilizer is blended therein, dispersibility of the polyamide resin and the styrene-isobutylene block copolymer can be improved and also elongation of the hose can be improved.

Examples of the compatibilizer include, for example, an ethylene-glycidyl methacrylate copolymer (EGMA), a modified EGMA, an ethylene-glycidyl methacrylate-vinyl acetate copolymer, an ethylene-glycidyl methacrylate-methyl acrylate copolymer, an ethylene-methyl acrylate-acrylate copolymer, an ethylene-ethyl acrylate copolymer (EEA), a modified EEA, an ethylene-ethyl acrylate-maleic anhydride-methacrylate copolymer, an ethylene-methacrylate copolymer, an acrylic rubber, an ethylene-vinyl acetate copolymer (EVAc), a modified EVAc, modified polypropylene (PP), modified polyethylene (PE), an ethylene-ester acrylate-maleic anhydride copolymer, an epoxidized styrene-butadiene-styrene triblock copolymer (epoxidized SBS), an epoxidized styrene-ethylene butene-styrene triblock copolymer (epoxidized SEBS), an acid-modified SBS, an acid-modified SEBS, a styrene-isopropenyl oxazoline copolymer, a glycidyl methacrylate-methyl methacrylate copolymer, a glycidyl methacrylate-styrene copolymer and thermoplastic urethane, which may be used either alone or in combination.

Examples of a modified EGMA include, for example, those which are obtained by grafting polystyrene (PS), polymethyl methacrylate (PMMA), an acrylonitrile-styrene copolymer (AS), a copolymer of PMMA and butyl acrylate, or the like, to EGMA.

Examples of a modified EEA include, for example, those which are obtained by grafting PS, PMMA, AS, a copolymer of PMMA and butyl acrylate, or the like, to EEA; a maleic anhydride modified EEA; and a silane modified EEA.

Examples of an ethylene-ethyl acrylate-maleic anhydride-methacrylate copolymer include, for example, those which are obtained by grafting PS, PMMA, AS, a copolymer of PMMA and butyl acrylate, or the like, to an ethylene-ethyl acrylate-maleic anhydride copolymer.

Examples of a modified EVAc include, for example, those which are obtained by grafting PS, PMMA, AS, a copolymer of PMMA and butyl acrylate, or the like, to EVAc.

Examples of a modified PP include, for example, those which are obtained by grafting PS or AS to PP, and a maleic anhydride modified PP.

Examples of the modified PE include, for example, those which are obtained by grafting PS, PMMA, AS, a copolymer of PMMA and butyl acrylate, or the like, to low-density polyethylene (LDPE), and a maleic anhydride modified PE.

The blending ratio of the compatibilizer is preferably not more than 10 parts by weight (hereinafter just abbreviated to parts) relative to 100 parts of total amount of the polyamide resin and the styrene-isobutylene block copolymer, particularly preferably 2 to 5 parts. Addition of the compatibilizer may further improve physical properties such as elongation, however, when the blending ratio is over 10 parts, water permeability resistance tends to deteriorate, so that a barrier property of the styrene-isobutylene block copolymer against water may deteriorate.

The material for forming the adhesive layer 2 provided between the inner layer 1 and the outer layer 3 is not particularly limited. Examples thereof include, for example, an acid-modified polyolefin resin modified with anhydride maleic acid or the like, a blend mainly composed of polyolefin and nylon (polyamide), and the above-mentioned compatibilizers, which may be used either alone or in combination.

The inventive fuel cell hose, as shown in the FIGURE, can be produced, for example, as follows. The polyolefin resin and the styrene-isobutylene block copolymer, and any of the other components, as required, are blended at a specified ratio and then the resulting mixture is kneaded by means of a twin screw extruder at a specified temperature (preferably 190 to 220° C.) for preparation of the material for forming the inner layer 1. The polyamide resin and the styrene-isobutylene block copolymer, and any of the other components, as required, are blended at a specified ratio and then the resulting mixture is kneaded by means of a twin screw extruder at a specified temperature (preferably 190 to 250° C.) for preparation of the material for forming the outer layer 3. Further, the material for forming the adhesive layer 2 is prepared. Then, an extruder for extruding each of the materials for forming the inner layer 1, the adhesive layer 2 and the outer layer 3 is prepared. Each material is extruded by each extruder and is combined into a die, and then is passed through a sizing die for forming a fuel cell hose having an inner layer 1, an adhesive layer 2 formed on an outer peripheral surface of the inner layer 1, and an outer layer 3 formed on an outer peripheral surface of the adhesive layer 2. When forming a fuel cell hose into a corrugated shape, a corrugated fuel cell hose having specific dimensions may be obtained by passing the thus extruded molten tube through a corrugate forming machine.

The thus produced hose may preferably have an inner diameter of 2 to 40 mm, particularly preferably 2.5 to 36 mm, and may preferably have an outer diameter of 3 to 44 mm, particularly preferably 4 to 40 mm. Further, the inner layer 1 of the thus produced hose may preferably have a thickness of 0.02 to 1.0 mm, particularly preferably 0.05 to 0.6 mm. The adhesive layer 2 of the thus produced hose may preferably have a thickness of 0.05 to 0.2 mm, particularly preferably 0.05 to 0.1 mm. Still further, the outer layer 3 of the thus produced hose may preferably have a thickness of 0.2 to 1.5 mm, particularly preferably 0.3 to 1.0 mm.

In the inventive fuel cell hose, the flexural modulus of the inner layer 1 is preferably 100 to 1200 MPa, particularly preferably 500 to 1000 MPa and flexural modulus of the outer layer 3 is preferably 350 to 1200 MPa, particularly preferably 600 to 100 MPa.

The structure of the fuel cell hose is not limited to the aforesaid three-layer structure and the hose may have more than three layers such as, for example, a five-layer structure (an inner layer 1, an adhesive layer 2, a barrier layer, another adhesive layer 2 and an outer layer 3) by forming a barrier layer using PPS (polyphenylene sulfide), liquid crystal polymer (LCP) polyester resin, an ethylene-vinyl alcohol copolymer (EVOH) or the like, between the inner layer 1 and the outer layer 3, and also forming each adhesive layer 2 between the inner layer 1 and the barrier layer and between the barrier layer and the outer layer 3, respectively. In this case, the inventive fuel cell hose has superior barrier properties on both sides of the inner layer 1 and the outer layer 3, the barrier layer can be protected from moisture invaded both through an inner side and an outer side thereof, and the deterioration of physical properties such as barrier properties and hydrolysis can be restricted.

Further, in the inventive fuel cell hose, any layer constituting the fuel cell hose may preferably not contain a plasticizer. In the present invention, a plasticizer means a chemical compound which has a plasticizing capacity and also which contains sulfur element (S) in its molecular structure. Especially, when any layer constituting the hose does not contain such a plasticizer, fluid flowing through the hose may not be contaminated therefrom and thus the low extraction property is excellent, resulting in restriction of the deterioration in electrical generating capacity.

The inventive fuel cell hose may be used as a fuel cell hose for transporting pure water and a hydrogen hose for transporting hydrogen or hydrogen-containing water. The inventive fuel cell hose may preferably have a three-layer structure, as shown in the FIGURE, in the case where the fuel cell hose is used for transporting pure water. The inventive fuel cell hose may preferably have a five-layer structure of an inner layer 1, an adhesive layer 2, a barrier layer, another adhesive layer 2 and an outer layer 3, in the case where the fuel cell hose is used for transporting hydrogen or hydrogen-containing water.

Prior to conducting the Examples and the Comparative Examples, the following materials were obtained.

Polypropylene (PP) Resin

Polyolefin available from Sumitomo Mitsui Chemical Co., Ltd., of Tokyo, Japan.

Styrene-isobutylene-styrene Triblock Copolymer (SIBS)

SIBSTAR 103T-U available from Kaneka Corporation of Osaka, Japan.

Styrene-butadiene-styrene triblock copolymer (SBS)

Kraton D1102 available from Kraton Polymer Japan of Tokyo, Japan.

PA12

UBESTA 3030B available from UBE INDUSTRIES, LTD. of Tokyo, Japan.

Compatibilizer A

Modified EGMA (MODIPER A4100 available from NOF CORPORATION of Tokyo, Japan) obtained by grafting polystyrene to EGMA.

Compatibilizer B

Epoxidized SBS (EPOFRIEND AT501 available from DAICEL CHEMICAL INDUSTRIES, LTD. of Osaka, Japan).

Compatibilizer C

Acid modified SEBS (Tuftec M1913 available from ASAHI KASEI CHEMICALS of Tokyo, Japan).

Compatibilizer D

Modified EGMA (MODIPER A4300 available from NOF CORPORATION of Tokyo, Japan) obtained by grafting a copolymer of PMMA and butyl acrylate to EGMA Next, an explanation will be given to Examples and Comparative Examples.

EXAMPLE 1

Each inner-layer material was blended as shown in Table 1, and then the resulting mixture was kneaded by means of a twin screw extruder at 200° C. for preparation of a material for forming an inner layer. Each outer-layer material was blended as shown in Table 1, and then the resulting mixture was kneaded by means of a twin screw extruder at 200° C. for preparation of a material for forming an outer layer. As a material for forming an adhesive layer, maleic anhydride modified PP (ADMER QF500 available from Mitsui Chemical Industries, Ltd. of Tokyo, Japan) was prepared. Then, an extruder for extruding each of the materials for forming an inner layer, an adhesive layer and an outer layer was prepared. Each material was extruded by each extruder and was combined into a die, and then was passed through a sizing die for forming a fuel cell hose (an inner diameter of 12 mm and an outer diameter of 14 mm) having an inner layer (a thickness of 0.4 mm), an adhesive layer (a thickness of 0.1 mm) formed on an outer peripheral surface of the inner layer, and an outer layer (a thickness of 0.5 mm) formed on an outer peripheral surface of the adhesive layer.

EXAMPLES 2 to 12, COMPARATIVE EXAMPLES 1 to 5

Each hose was produced in the same manner as in Example 1 except that the material for forming an inner layer or the material for forming an outer layer was changed to a combination as shown in the following Tables 1 to 3.

Properties of the hoses thus produced in accordance with the Examples and the Comparative Examples were evaluated in the following manners. The results of the evaluations are also shown in Tables 1 to 3.

Elongation at Break (EB)

Each elongation at break (EB; %) of inner layers and outer layers was measured in accordance with ASTM D 638.

Flexural Modulus

Each flexural modulus (MPa) of inner layers and outer layers was measured in accordance with ASTM D 790.

Permeability Constant

Each sample sheet having a thickness of 0.3 mm was prepared by using each material for forming inner layers and each material for forming outer layers. Each permeability constant [(mg·mm)/(cm$^2$·day)] was measured by means of a cup test jig. First, the cup test jig (inner diameter: 66 mm, inner volume: 135 cm$^3$, permeation dimensions: 34.2 cm$^2$) was prepared. The sample sheet was fixed to a lower side of the cup test jig via butyl rubber packing. The cup test jig was filled with pure water (100 cm$^3$) in such a manner that the sample sheet was in contact with pure water, and then was allowed to stand at a fixed temperature of 80° C. Time for letting to stand and decreasing amount of pure water were plotted in a graph. The permeability constant [(mg·mm)/(cm$^2$·day)] was calculated by inclination of the curve.

Low-temperature Flexibility

After cooling each hose at −40° C. for 4 hours, the hose was bent to 180°. Then, low-temperature flexibility was evaluated. In Tables, the symbol × indicates that abnormalities such as cracking occurred on an inner surface or an outer surface of the hose, while the symbol ○ indicates that no abnormalities occurred.

Press-fitting of Connector

Each connector was inserted into the thus obtained hose. In Tables, the symbol X indicates that abnormalities such as buckling or cracking occurred, while the symbol ○ indicates that no abnormalities occurred.

TABLE 1

| | | | | EXAMPLE | | | | | (Parts) |
|---|---|---|---|---|---|---|---|---|---|
| | 1 | 2 | 3 | 4 | 5 | 6 | 7 | 8 | |
| Inner layer | | | | | | | | | |
| PP | 50 | 80 | 20 | 50 | 50 | 50 | 50 | 50 | |
| SIBS | 50 | 20 | 80 | 50 | 50 | 50 | 50 | 50 | |
| Outer layer | | | | | | | | | |
| PA12 | 60 | 60 | 60 | 80 | 90 | 70 | 60 | 60 | |
| SIBS | 40 | 40 | 40 | 20 | 10 | 30 | 40 | 40 | |
| Compatibilizer A | — | — | — | — | — | 10 | — | — | |
| Compatibilizer B | — | — | — | — | — | — | 20 | 10 | |
| Compatibilizer C | — | — | — | — | — | — | — | — | |

TABLE 1-continued

|  | EXAMPLE | | | | | | | | (Parts) |
|---|---|---|---|---|---|---|---|---|---|
|  | 1 | 2 | 3 | 4 | 5 | 6 | 7 | 8 | |
| Compatibilizer D | — | — | — | — | — | — | — | — | |
| Inner layer | | | | | | | | | |
| Elongation at break (%) | 590 | 670 | 550 | 590 | 590 | 590 | 590 | 590 | |
| Flexural modulus (MPa) | 690 | 1120 | 150 | 690 | 690 | 690 | 690 | 690 | |
| Permeability constant (*) | 0.8 | 0.7 | 1.1 | 0.8 | 0.8 | 0.8 | 0.8 | 0.8 | |
| Outer layer | | | | | | | | | |
| Elongation at break (%) | 200 | 200 | 200 | 240 | 260 | 300 | 550 | 360 | |
| Flexural modulus (MPa) | 730 | 730 | 730 | 1010 | 1200 | 890 | 660 | 650 | |
| Permeability constant (*) | 1.9 | 1.9 | 1.9 | 2.2 | 2.5 | 2.6 | 2.4 | 1.9 | |
| Low-temperature flexibility | ○ | ○ | ○ | ○ | ○ | ○ | ○ | ○ | |
| Press-fitting of connector | ○ | ○ | ○ | ○ | ○ | ○ | ○ | ○ | |

(*): [(mg · mm)/(cm$^2$ · day)]

TABLE 2

|  | EXAMPLE | | | | (Parts) |
|---|---|---|---|---|---|
|  | 9 | 10 | 11 | 12 | |
| Inner layer | | | | | |
| PP | 50 | 50 | 50 | 50 | |
| SIBS | 50 | 50 | 50 | 50 | |
| Outer layer | | | | | |
| PA12 | 60 | 70 | 70 | 20 | |
| SIBS | 40 | 30 | 30 | 80 | |
| Compatibilizer A | — | — | — | — | |
| Compatibilizer B | 4 | — | — | 20 | |
| Compatibilizer C | — | 10 | — | — | |
| Compatibilizer D | — | — | 10 | — | |
| Inner layer | | | | | |
| Elongation at break (%) | 590 | 590 | 590 | 590 | |
| Flexural modulus (MPa) | 690 | 690 | 690 | 690 | |
| Permeability constant (*) | 0.8 | 0.8 | 0.8 | 0.8 | |
| Outer layer | | | | | |
| Elongation at break (%) | 350 | 380 | 250 | 550 | |
| Flexural modulus (MPa) | 650 | 820 | 840 | 360 | |
| Permeability constant (*) | 1.9 | 2.6 | 2.6 | 1.4 | |
| Low-temperature flexibility | ○ | ○ | ○ | ○ | |
| Press-fitting of connector | ○ | ○ | ○ | ○ | |

(*): [(mg · mm)/(cm$^2$ · day)]

TABLE 3

|  | COMPARATIVE EXAMPLE | | | | | (Parts) |
|---|---|---|---|---|---|---|
|  | 1 | 2 | 3 | 4 | 5 | |
| Inner layer | | | | | | |
| PP | 100 | 80 | 60 | 50 | — | |
| SIBS | — | 20 | — | 50 | 100 | |
| SBS | — | — | 40 | — | — | |
| Outer layer | | | | | | |
| PA12 | 100 | 100 | 100 | 60 | 10 | |
| SIBS | — | — | — | — | 90 | |
| Compatibilizer A | — | — | — | — | — | |
| Compatibilizer B | — | — | — | — | — | |
| Compatibilizer C | — | — | — | 40 | — | |
| Compatibilizer D | — | — | — | — | — | |
| Inner layer | | | | | | |
| Elongation at break (%) | 710 | 670 | 600 | 590 | 620 | |
| Flexural modulus (MPa) | 1850 | 1120 | 850 | 690 | 40 | |
| Permeability constant (*) | 0.6 | 0.7 | — | 0.8 | 1.1 | |
| Outer layer | | | | | | |
| Elongation at break (%) | 420 | 420 | 420 | 360 | 370 | |
| Flexural modulus (MPa) | 1360 | 1360 | 1360 | 560 | 180 | |
| Permeability constant (*) | 3.0 | 3.0 | 3.0 | — | 1.3 | |
| Low-temperature flexibility | X | ○ | ○ | ○ | ○ | |
| Press-fitting of connector | X | X | ○ | ○ | X | |

(*): [(mg · mm)/(cm$^2$ · day)]

As can be understood from the above results, each Example was superior in a barrier property against water as shown by the low permeability constant, was also superior in low-temperature flexibility, and occurred no abnormalities such as buckling or cracking when press-fitting of the connector.

In contrast, the hose of Comparative Example 1, using PP for forming an inner layer, was superior in a barrier property, however, low-temperature flexibility was inferior and abnormalities such as cracking occurred when press-fitting of the connector. Since the hose of Comparative Example 2 did not use SIBS for forming an outer layer, abnormalities such as cracking occurred when press-fitting of the connector. Since the hose of Comparative Example 3 used SBS for forming an inner layer, the inner layer was broken during the permeability test, so that evaluation could not be conducted, which means that its water proof property was remarkably inferior. Since the hose of Comparative Example 4 used the compatibilizer C (acid-modified SEBS) for forming an outer layer, the outer layer was broken during the permeability test, so that evaluation could not be conducted, which means that its water proof property was remarkably inferior. Since the inner layer of the hose of Comparative Example 5 was formed only by SIBS, the hose did not have rigidity, and thus buckling occurred when press-fitting of the connector so that the connector could not be press-fitted. Further, the hose of Comparative Example 5 was thought to be inferior in heat resistance.

The inventive fuel cell hose can be used in the fuel cell system for transporting pure water and as a hydrogen hose for transporting hydrogen or water containing hydrogen.

What is claimed is:

1. A fuel cell hose comprising an inner layer in contact with fluid and an outer layer formed on an outer peripheral surface of the inner layer, the inner layer being formed by a material (A) comprising a polyolefin resin and a styrene-isobutylene block copolymer and the outer layer being formed by a material (B) comprising a polyamide resin and a styrene-isobutylene block copolymer.

2. A hose as set forth in claim 1, wherein neither of said inner layer nor said outer layer contains a plasticizer.

3. A hose as set forth in claim 2, wherein the material (B) contains a compatibilizer.

4. A hose as set forth in claim 3, wherein a blending ratio by weight of the polyolefin resin to the styrene-isobutylene block copolymer in the material (A) is 20/80 to 80/20.

5. A hose as set forth in claim 4, wherein a blending ratio by weight of the polyamide resin to the styrene-isobutylene block copolymer in the material (B) is 20/80 to 90/10.

6. A hose as set forth in claim 3, wherein a blending ratio by weight of the polyamide resin to the styrene-isobutylene block copolymer in the material (B) is 20/80 to 90/10.

7. A hose as set forth in claim 2, wherein a blending ratio by weight of the polyolefin resin to the styrene-isobutylene block copolymer in the material (A) is 20/80 to 80/20.

8. A hose as set forth in claim 7, wherein a blending ratio by weight of the polyamide resin to the styrene-isobutylene block copolymer in the material (B) is 20/80 to 90/10.

9. A hose as set forth in claim 2, wherein a blending ratio by weight of the polyamide resin to the styrene-isobutylene block copolymer in the material (B) is 20/80 to 90/10.

10. A hose as set forth in claim 1, wherein the material (B) contains a compatibilizer.

11. A hose as set forth in claim 10, wherein a blending ratio by weight of the polyolefin resin to the styrene-isobutylene block copolymer in the material (A) is 20/80 to 80/20.

12. A hose as set forth in claim 11, wherein a blending ratio by weight of the polyamide resin to the styrene-isobutylene block copolymer in the material (B) is 20/80 to 90/10.

13. A hose as set forth in claim 10, wherein a blending ratio by weight of the polyamide resin to the styrene-isobutylene block copolymer in the material (B) is 20/80 to 90/10.

14. A hose as set forth in claim 1, wherein a blending ratio by weight of the polyolefin resin to the styrene-isobutylene block copolymer in the material (A) is 20/80 to 80/20.

15. A hose as set forth in claim 14, wherein a blending ratio by weight of the polyamide resin to the styrene-isobutylene block copolymer in the material (B) is 20/80 to 90/10.

16. A hose as set forth in claim 1, wherein a blending ratio by weight of the polyamide resin to the styrene-isobutylene block copolymer in the material (B) is 20/80 to 90/10.

* * * * *